United States Patent [19]

Kishimoto et al.

[11] Patent Number: 5,061,768

[45] Date of Patent: Oct. 29, 1991

[54] VINYLIDENE CYANIDE COPOLYMER

[75] Inventors: Manabu Kishimoto; Iwao Seo; Yukiko Fujimoto, all of Ami, Japan

[73] Assignee: Mitsubishi Petrochemical Co., Inc., Tokyo, Japan

[21] Appl. No.: 571,154

[22] Filed: Aug. 23, 1990

[30] Foreign Application Priority Data

Aug. 28, 1989 [JP] Japan .................................. 1-218619

[51] Int. Cl.$^5$ .................. C08F 22/34; C08F 22/18
[52] U.S. Cl. .................................. 526/245; 526/297; 526/292.6; 310/357; 310/800
[58] Field of Search .................... 526/297, 245, 292.6; 310/357, 800

[56] References Cited

U.S. PATENT DOCUMENTS 2,716,106  8/1955  Gilbert ............................... 526/300
4,591,465  5/1986  Miyata ................................. 264/22

Primary Examiner—Joseph L. Schofer
Assistant Examiner—M. Nagumo
Attorney, Agent, or Firm—Oblon, Spivak, McClelland, Maier & Neustadt

[57] ABSTRACT

Disclosed is a vinylidene cyanide copolymer obtained by copolymerization of vinylidene cyanide and two kind of vinyl compounds.

By formation of a ternary copolymer, a monomer difficultly copolymerizabke with vinylidene cyanide can be incorporated into the polymer, and high piezoelectric performance can be obtained when polarized.

7 Claims, No Drawings

VINYLIDENE CYANIDE COPOLYMER

BACKGROUND OF THE INVENTION

This invention relates to a ternary copolymer of vinylidene cyanide with two different kinds of vinyl compounds which gives a molded product which is transparent and has a high dielectric constant.

A large number of copolymers of vinylidene cyanide with various vinyl compounds have been known (e.g. U.S. Pat. No. 2,716,106, H. Gilbert et al., *J. Am. Chem. Soc.*, 78, 1669 (1956), etc.). However, there are no examples in the prior art wherein a ternary copolymer is evaluated and considered for application as a piezoelectric material or photo-functional material.

SUMMARY OF THE INVENTION

An object of the present invention is to provide a ternary copolymer obtained by copolymerization of vinylidene cyanide with two different kinds of vinyl compounds.

The ternary copolymer of the present invention has excellent transparency and can be formed into an electret to give excellent pyroelectric and piezoelectric characteristics.

The present invention is a random vinylidene cyanide copolymer comprising the structural units represented by (I), (II) and (III) shown below, with the total molar ratio of (II) and (III) to (I) being 0.8 to 20, having a molecular weight (Mw) of 200,000 to 1,500,000:

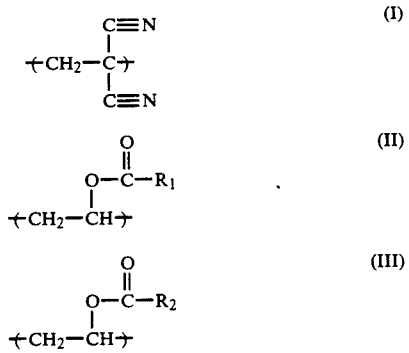

wherein $R_1$ and $R_2$ are different, and each represent hydrogen atom, a straight alkyl group having 1 to 15 carbon atoms, di- or trichloromethyl group, di- or trifluoromethyl group, t-butyl group, phenyl group, 4-nitrophenyl group, 4-cyanophenyl group, 4-trifluoromethylphenyl group or naphthyl group.

DESCRIPTION OF THE PREFERRED EMBODIMENTS

In the vinyl structural unit to be used in the present invention, examples of the straight alkyl group having 1 to 15 carbon atoms of $R_1$ or $R_2$ may include methyl group, ethyl group, propyl group, butyl group, pentyl group, hexyl group, heptyl group, octyl group, nonyl group, decanyl group, undecanyl group, dodecanyl group, tridecanyl group, tetradecanyl group and pentadecanyl group. Preferred examples of $R_1$ and $R_2$ may include hydrogen atom, methyl group and butyl group.

Preferred ternary copolymer may be a ternary copolymer of vinylidene cyanide, vinyl acetate and a vinyl compound represented by the formula (III) wherein $R_2$ is hydrogen atom or a straight alkyl group having 2 to 6 carbon atoms or a ternary copolymer of vinylidene cyanide, vinyl formate and a vinyl compound represented by the formula (III) wherein $R_2$ is a straight alkyl group having 2 to 6 carbon atoms.

Among the ternary copolymers of the present invention, vinylidene cyanide-vinyl acetate-vinyl formate ternary copolymer, vinylidene cyanide-vinyl acetate-vinyl butyrate ternary copolymer or vinylidene cyanide-vinyl formate-vinyl butyrate ternary copolymer is particularly preferred.

Vinylidene cyanide units (I), and the vinyl units (II) and (III) will form a random copolymer.

The ratio of vinylidene cyanide units (I) to the vinyl units (II) and (III) in the random copolymer may be, in a molar ratio of $\{(II)+(III)\}/(I)$, within the range of from 0.8 to 20, preferably from 0.9 to 15.

The ratio of the vinyl units (II) to (III) may be preferably within the range of from 0.2/1 to 5/1, more preferably 0.3/1 to 3/1, particularly preferably 0.5/1 to 2.0/1.

The copolymer of the present invention is a resin having low crystallinity, with a glass transition point being within the range of from 100° to 250° C., preferably from 140° to 200° C.

When the present polymer is molded into a film or a disc, for imparting strength which can stand use, its molecular weight (Mw: weight average molecular weight) should be within the range of from 200,000 to 1,500,000, preferably from 500,000 to 1,000,000.

As the method for preparing the copolymer of the present invention, it can be prepared by polymerizing vinylidene cyanide

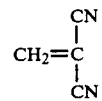

together with vinyl compounds $CH_2=CHOCOR_1$ and $CH_2=CHOCOR_2$ in a solvent, in a slurry or in absence of a solvent by use of a radical polymerization initiator.

The total amount of the two kinds of vinyl compounds (II) and (III) used may be 0.8 to 20 mole equivalents based on one mole of vinylidene cyanide (I), and desirably 1 to 8 mole equivalents when an alternate copolymer is synthesized, or 8 to 20 mole equivalents in the case of a random copolymer. Here, the alternate copolymer means a copolymer comprising the above three structural units represented by (I) to (III) wherein the structural unit represented by (I) and either one of the structural units represented by (II) and (III) are alternately polymerized.

The molar ratio of the two kinds of vinyl compounds (II) and (III) can be varied as desired corresponding to the desired polymer species.

When a solvent is employed, it is preferred to carry out the reaction in a solvent system selected from among aprotic solvents such as benzene, toluene and xylene, aliphatic hydrocarbons such as pentane, hexane and heptane.

The polymerization temperature may be 0° to 150° C., but desirably 50° to 80° C., in the case of slurry polymerization.

In the case of polymerization in an ampoule or an autoclave, the temperature is not particularly limited, but the reaction can be carried out at 0° to 100° C.

As the radical polymerization initiator, there can be employed, for example, organic peroxides such as lauroyl peroxide, benzoyl peroxide, acetyl peroxide and diisopropyl peroxycarbonate, or azo compounds such as 2,2'-azobisisobutyronitrile.

After completion of the polymerization, an aprotic solvent is poured into the reaction mixture, and the polymer formed is separated by filtration. Subsequently, the polymer formed is washed and dried to give the desired copolymer.

The polymer obtained can be molded into a desired shape such as film, fiber and others by casting, spin coating, dipping, pressing, extrusion, injection, etc.

By way of stretching, cyano groups can be readily oriented in one direction.

Stretching may be practiced at a temperature range of from $Tg+10°$ C. to $Tg-10°$ C. relative to the glass transition temperature (Tg) of the polymer, and stretching may be effected to 1.5 to 6-fold, preferably 3 to 6-fold relative to the length before stretching.

Also, by applying a high potential on the product obtained to effect polarization, the dipoles such as cyano groups can be oriented in the vertical direction relative to the film surface.

Polarization may be effected at a temperature of the glass transition temperature $(Tg)+10°$ C. to $Tg-10°$ C. for 0.5 to 5 hours, preferably 0.5 to 2 hours.

The copolymer of the present invention is a polymer having cyano groups and ester groups with great polarity, can be molded according to molding methods in general, namely casting, pressing and injection molding, and the molded product has high dielectric characteristic and can be used as the insulating layer for condensors and EL (electroluminescence) devices. Also, a molded product with good transparency can be obtained, and it is also useful as the optical material such as fiber and lens. And, those subjected to polarization treatment can be used not only as high functional materials such as piezoelectric and pyroelectric materials, but are also useful as the optical materials such as light wavelength converting device, optical shutter, optical deflecting device, optical strength.phase modulating device and high speed optical switching device, thus being of practical value in application for optical communication, optical information processing and optical working.

EXAMPLES

The present invention is described specifically by referring to Examples. However, the present invention is not limited by these Examples at all.

EXAMPLE 1

A 200 ml autoclave equipped with a stirring device was charged with 20 g (0.26 mole) of vinylidene cyanide, 46.8 g (0.65 mole) of vinyl formate, 55.9 g (0.65 mole, available from Wako Junyaku K.K.) of vinyl acetate and 20 mg of lauroyl peroxide, and the mixture was stirred under heating at 80° C. for 2 hours. After the pressure returned to atmospheric pressure, toluene was added, the polymer was separated by filtration, washed successively with toluene and methanol, in this order, and dried under reduced pressure at 80° C. overnight. The yield of the product was found to be 15.5 g. When the product was subjected to analysis by $^1$H-NMR, $^{13}$C-NMR and IR (infrared absorption spectrum), the molar ratio of vinylidene cyanide units to the two kinds of vinyl units was confirmed to be approximately 1:1, and that of vinyl formate units to vinyl acetate units 1:1.47. In IR-absorption spectrum, respective absorptions $\nu_{CO}=1740$ cm$^{-1}$ and $\nu_{CN}=2250$ cm$^{-1}$ of CO and CN were recognized.

In the following, main physical properties data (powder) of the product are shown:
Glass transition temperature (Tg): 167° C.
Intrinsic viscosity [η]: 3.5 dl/g
Elemental analysis results: vinylidene cyanide content 50 mole %.

The powder obtained was dissolved in dimethylacetamide (DMA) solvent, and a film was prepared according to the solvent cast method and the dielectric constant was measured at room temperature (25° C.). The results are shown in Table 1.

TABLE 1

| Frequency | Dielectric constant |
|---|---|
| 100 Hz | 4.72 |
| 1 kHz | 4.47 |
| 100 kHz | 4.02 |

Also, the relationship between temperature and dielectric constant was determined at a frequency of 100 Hz, and the results are shown in Table 2.

TABLE 2

| Measurement temperature (°C.) | Dielectric constant |
|---|---|
| 130 | 6.8 |
| 140 | 7.6 |
| 150 | 9.2 |
| 160 | 31 |
| 170 | 118 |

Also, the cast film stretched to about 3-fold in monoaxial direction in a silicone oil bath controlled to 162° C. followed by polarization treatment was subjected to measurement of piezoelectric constant $d_{31}$ and $K_t$. The value of $d_{31}$ showing a transverse piezoelectric effect was obtained by measuring a charged amount generated on the surface of a sample at 110 Hz and a stress at the sectional surface of the sample by use of Vibron-II (trade name, manufactured by Toyo Boldwin Co.). The electromechanical bonding constant $K_t$ showing a longitudinal piezoelectric effect was obtained by applying a high frequency voltage (1 to 100 MHz) to a sample and analyzing an electric impedance at a resonance point. The results are shown in Table 3.

TABLE 3

| Polarization temperature (°C.) | Electrical field strength (kV/cm) | Polarization time (hr) | $d_{31}$ (CGSesu) | $K_t$ (%) |
|---|---|---|---|---|
| 156 | 450 | 1 | $8.0 \times 10^{-8}$ | 12.7 |
| 156 | 600 | 1 | $12.1 \times 10^{-8}$ | 15.1 |
| 156 | 700 | 1 | $13.3 \times 10^{-8}$ | 14.8 |

The intrinsic viscosity [η] was measured by preparing DMF solutions of known concentrations with the use of an Ostwald type viscometer.

The molecular weight of the polymer was measured by GPC (gel permeation chromatography) (DMF) and determined as calculated from PS (polystyrene).

EXAMPLE 2

Example 1 was repeated except for using 18.7 g (0.26 mole) of vinyl formate and 89.4 g (1.04 mole, available from Wako Junyaku K.K.) of vinyl acetate to obtain 15.9 g of the product. When the product was analyzed similarly as in Example 1, the molar ratio of vinylidene cyanide units to the two kinds of vinyl units was confirmed to be approximately 1:1, and the molar ratio of vinyl formate units to vinyl acetate units of 1:6.

In the following, main physical properties data (powder) of the product are shown:
Glass transition temperature (Tg): 178° C.
Intrinsic viscosity [θ]: 4.7 dl/g
Elemental analysis results: vinylidene cyanide content 50 mole %.

The powder obtained was dissolved in dimethylacetamide (DMA) solvent, and a film was prepared according to the solvent cast method and the dielectric constant was measured at room temperature (25° C.). The results are shown in Table 4.

TABLE 4

| Frequency | Dielectric constant |
|---|---|
| 100 Hz | 3.97 |
| 1 kHz | 3.81 |
| 100 kHz | 3.51 |

Also, the relationship between temperature and dielectric constant was determined at a frequency of 100 Hz, and the results are shown in Table 5.

TABLE 5

| Measurement temperature (°C.) | Dielectric constant |
|---|---|
| 140 | 5.8 |
| 150 | 6.4 |
| 160 | 7.6 |
| 170 | 43 |
| 180 | 117 |

Also, the cast film stretched to about 3-fold in monoaxial direction in a silicone oil bath controlled to 178° C. followed by polarization treatment was subjected to measurement of piezoelectric constant $d_{31}$ and $K_t$. The results are shown in Table 6.

TABLE 6

| Polarization temperature (°C.) | Electrical field strength (kV/cm) | Polarization time (hr) | $d_{31}$ (CGSesu) | $K_t$ (%) |
|---|---|---|---|---|
| 168 | 450 | 1 | $11.0 \times 10^{-8}$ | 12.5 |
| 168 | 600 | 1 | $11.6 \times 10^{-8}$ | 14.2 |
| 168 | 700 | 1 | $13.0 \times 10^{-8}$ | 16.9 |

EXAMPLE 3

Into a 50 ml four-necked flask equipped with a stirring device and a thermometer were charged 5 g (0.064 mole) of vinylidene cyanide, 14 g (0.16 mole, available from Wako Junyaku K.K.) of vinyl acetate, 19 g (0.16 mole, available from Wako Junyaku K.K.) of vinyl chloroacetate and 50 mg of lauroyl peroxide, and the mixture was stirred under heating at 70° C. for 15 minutes. After completion of the reaction, the polymer was separated by filtration, washed with toluene and methanol in this order, and dried under reduced pressure at 80° C. overnight. The yield of the product was found to be 5.7 g. When the product was analyzed in the same manner as in Example 1, the ratio of vinylidene cyanide units to the two kinds of vinyl units was confirmed to be approximately 1:1, and the ratio of vinyl acetate to vinyl chloroacetate of 7.7:1.

In the following, main physical properties data (powder) of the product are shown:
Glass transition temperature (Tg): 175° C.
Intrinsic viscosity [θ]: 4.3 dl/g
Elemental analysis results: vinylidene cyanide content 50 mole %.

The powder obtained was dissolved in dimethylacetamide (DMA) solvent, and a film was prepared according to the solvent cast method and the dielectric constant was measured at room temperature (25° C.). The results are shown in Table 7.

TABLE 7

| Frequency | Dielectric constant |
|---|---|
| 100 Hz | 4.58 |
| 1 kHz | 4.35 |
| 100 kHz | 4.13 |

Also, the relationship between temperature and dielectric constant was determined at a frequency of 100 Hz, and the results are shown in Table 8.

TABLE 8

| Measurement temperature (°C.) | Dielectric constant |
|---|---|
| 150 | 5.5 |
| 160 | 6.1 |
| 170 | 65 |
| 180 | 137 |
| 190 | 220 |

Also, the cast film stretched to about 3-fold in monoaxial direction in a silicone oil bath controlled to 170° C. followed by polarization treatment was subjected to measurement of piezoelectric constant $d_{31}$ and $K_t$. The results are shown in Table 9.

TABLE 9

| Polarization temperature (°C.) | Electrical field strength (kV/cm) | Polarization time (hr) | $d_{31}$ (CGSesu) | $K_t$ (%) |
|---|---|---|---|---|
| 165 | 450 | 1 | $8.2 \times 10^{-8}$ | 5.3 |
| 165 | 600 | 1 | $9.8 \times 10^{-8}$ | 7.2 |
| 165 | 750 | 1 | $11.3 \times 10^{-8}$ | 9.8 |

EXAMPLE 4

Example 3 was repeated except for using 22 g (0.26 mole, available from Wako Junyaku K.K.) of vinyl acetate and 7.8 g (0.065 mole, available from Wako Junyaku K.K.) of vinyl chloroacetate to obtain 3.6 g of the product. When the product was analyzed similarly as in Example 1, the molar ratio of vinylidene cyanide units to the two kinds of vinyl units was confirmed to be approximately 1:1, and the molar ratio of vinyl acetate units to vinyl chloroacetate units 1.8:1.

In the following, main physical properties data (powder) of the product are shown:
Glass transition temperature (Tg): 180° C.
Intrinsic viscosity [θ]: 4.0 dl/g
Elemental analysis results: vinylidene cyanide content 50 mole %.

The powder obtained was dissolved in dimethylacetamide (DMA) solvent, and a film was prepared according to the solvent cast method and the dielectric constant was measured at room temperature (25° C.). The results are shown in Table 10.

TABLE 10

| Frequency | Dielectric constant |
|---|---|
| 100 Hz | 3.75 |
| 1 kHz | 3.59 |

TABLE 10-continued

| Frequency | Dielectric constant |
|---|---|
| 100 kHz | 3.35 |

Also, the relationship between temperature and dielectric constant was determined at a frequency of 100 Hz, and the results are shown in Table 11.

TABLE 11

| Measurement temperature (°C.) | Dielectric constant |
|---|---|
| 150 | 5.3 |
| 160 | 5.8 |
| 170 | 58 |
| 180 | 121 |
| 190 | 210 |

Also, the cast film stretched to about 3-fold in monoaxial direction in a silicone oil bath controlled to 175° C. followed by polarization treatment was subjected to measurement of piezoelectric constant $d_{31}$ and $K_t$. The results are shown in Table 12.

TABLE 12

| Polarization temperature (°C.) | Electrical field strength (kV/cm) | Polarization time (hr) | $d_{31}$ (CGSesu) | $K_t$ (%) |
|---|---|---|---|---|
| 165 | 450 | 1 | $9.8 \times 10^{-8}$ | 7.3 |
| 165 | 600 | 1 | $10.5 \times 10^{-8}$ | 9.5 |
| 165 | 750 | 1 | $12.8 \times 10^{-8}$ | 11.3 |

We claim:

1. In a piezoelectric material or element which is obtained by effecting polarization of a copolymer by applying a high potential after stretching the copolymer to 1.5 to 6-fold, the improvement wherein said copolymer comprises the structural unit represented by (I) and either one of the structural units represented by (II) and (III) being alternately polymerized with (I) with a ratio of the structural unit (II) to that of (III) being within the range of from 0.2/1 to 5/1, and has a weight average molecular weight of 200,000 to 1,500,000; wherein the structural units (I), (II), and (III) have the formulae

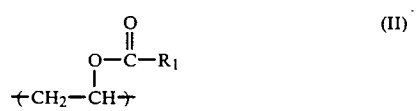

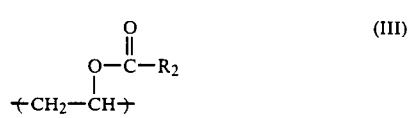

wherein $R_1$ and $R_2$ are different, and each represents a hydrogen atom, a straight chain alkyl group having 1 to 15 carbon atoms, di- or trichloromethyl, di- or trifluoromethyl, t-butyl, phenyl, 4-nitrophenyl, 4-cyanophenyl, 4-trifluoromethylphenyl or naphthyl.

2. The piezoelectric material or element according to claim 1, wherein $R_1$ and $R_2$ of formula (II) and (III) represent respectively hydrogen atom, a straight alkyl group having 1 to 6 carbon atoms, di- or trichloromethyl group, di- or trifluoromethyl group, or t-butyl group.

3. The piezoelectric material or element according to claim 1, wherein the vinylidene cyanide copolymer is a ternary copolymer comprising vinylidene cyanide, vinyl acetate and a compound of the formula (III) wherein $R_2$ is hydrogen or a straight alkyl group having 2 to 6 carbon atoms.

4. The piezoelectric material or element according to claim 1, wherein the vinylidene cyanide copolymer is a ternary copolymer comprising vinylidene cyanide, vinyl formate and a compound of the formula (III) wherein $R_2$ is a straight alkyl group having 2 to 6 carbon atoms.

5. The piezoelectric material or element according to claim 1, wherein the vinylidene cyanide copolymer is a ternary copolymer comprising vinylidene cyanide, vinyl acetate and vinyl formate.

6. The piezoelectric material or element according to claim 1, wherein the vinylidene cyanide copolymer is a ternary copolymer comprising vinylidene cyanide, vinyl acetate and vinyl butyrate.

7. The piezoelectric material or element according to claim 1, wherein said copolymer has a glass transition temperature of 100° to 250° C.

* * * * *

UNITED STATES PATENT AND TRADEMARK OFFICE
CERTIFICATE OF CORRECTION

PATENT NO. : 5,061,768
DATED : October 29, 1991
INVENTOR(S) : Manabu Kishimoto et al.

It is certified that error appears in the above-identified patent and that said Letters Patent is hereby corrected as shown below:

On the Title page:
The Assignee is incorrect, should be, --Mitsubishi Petrochemical Co., Ltd.--.

Signed and Sealed this

Eighteenth Day of May, 1993

Attest:

MICHAEL K. KIRK

*Attesting Officer*    Acting Commissioner of Patents and Trademarks